United States Patent
Marshall et al.

(10) Patent No.: US 8,949,318 B2
(45) Date of Patent: *Feb. 3, 2015

(54) DIGITAL IMAGE COMMUNICATION

(75) Inventors: Dennis Marshall, San Ramon, CA (US); Ronald S. Cok, Rochester, NY (US)

(73) Assignee: Kodak Alaris Inc., Rochester, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/161,593

(22) Filed: Jun. 16, 2011

(65) Prior Publication Data

US 2012/0321221 A1    Dec. 20, 2012

(51) Int. Cl.
| | |
|---|---|
| *G06F 15/16* | (2006.01) |
| *G06K 9/54* | (2006.01) |
| *G06F 17/30* | (2006.01) |
| *G06Q 50/00* | (2012.01) |
| *H04L 12/58* | (2006.01) |

(52) U.S. Cl.
CPC *G06F 15/16* (2013.01); *G06K 9/54* (2013.01); *G06F 17/30244* (2013.01); *G06Q 50/01* (2013.01); *H04L 51/12* (2013.01); *H04L 51/32* (2013.01)

USPC .......................................... 709/203; 709/204

(58) Field of Classification Search
CPC ............................... H04L 51/12; H04L 51/32
USPC .................................................. 709/203, 204
See application file for complete search history.

(56) References Cited

U.S. PATENT DOCUMENTS

| | | | |
|---|---|---|---|
| 6,711,293 B1 | 3/2004 | Lowe | |
| 2002/0161856 A1* | 10/2002 | Pineau et al. | 709/219 |
| 2006/0285149 A1* | 12/2006 | Dei | 358/1.15 |

* cited by examiner

*Primary Examiner* — Adnan Mirza
(74) *Attorney, Agent, or Firm* — Hogan Lovells US LLP

(57) ABSTRACT

A server analyzes a received digital image to determine and store one or more first image attributes. The image is transmitted to at least one recipient and pertinent information is recorded, including one or more image attributes and the one or more first image recipients. A second image is received and analyzed in a similar fashion as the first. Second image communication information is generated that is relevant to the second image based on a comparison with the first image communication information and the one or more first image attributes.

19 Claims, 6 Drawing Sheets

DIGITAL IMAGE COMMUNICATION

CROSS REFERENCE TO RELATED APPLICATIONS

Reference is made to commonly assigned, U.S. patent application Ser. No. 13/161,583 by Marshall et al. filed of even date herewith entitled "Digital Image Communication", the disclosure of which is incorporated herein by reference in its entirety.

FIELD OF THE INVENTION

The present invention relates to products, services, and communications that include digital images and, more particularly, to generating and employing information about digital image communication.

BACKGROUND OF THE INVENTION

Digital images are widely used to record personal events. These images are frequently shared with friends, relatives, and others within a social network. These digital images can be stored on a computer owned and operated, for example, by the person responsible for the digital images. Alternatively, digital images are transferred to storage computer servers accessible through the internet. These storage computer servers can be managed by companies providing image printing services.

More recently, social network computer systems available through the internet provide image storage as well as communication and interaction services. Among these services is the capability to make images accessible to users of the social network systems so that, for example, a user who has been granted authorization can view the images of other uses who grant the authorization.

Referring to FIG. 4, in a prior-art example, computers having processors 10, displays 12, and a user interface 14 such as a graphic user interface, are connected by a communication network 15 such as the internet to server computers 20 having storage 23 for providing computing and communication services.

While such social interaction capabilities are useful, they are limited in their ability to interact with others not in the social network or can be tedious to use. In particular, the integration of services designed for social interaction and image printing and fulfillment services can be improved. There is a need, therefore, for an improved method for communicating digital images and providing imaging products and services to consumers.

SUMMARY OF THE INVENTION

A preferred embodiment of the present invention includes a method of enhancing group communication. A server receives a digital image from a user over a network, such as the internet. It analyzes the image to determine and store one or more first image attributes. The image is transmitted to at least one recipient and pertinent information is recorded, including one or more first image attributes and the one or more first image recipients. A second image from the user is received and analyzed in a similar fashion as the first. Second image communication information is generated that is relevant to the second image based on a comparison with the first image communication information and the one or more first image attributes. The second image communication information is generated including one or more first image recipients and is sent to the user. Then it's sent to one or more second image recipients based on user review. Image identification information, communication destination information, communication reason information, communication product information, and communication type information can be selectively stored. Further images received can be processed similarly based on previous received image information. A history of image communication usage for users can be maintained by the server. This would include a history of people with whom images have been shared, the types of images that have been shared, and types of products for which images have been used.

Another preferred embodiment of the present invention includes a method of enhancing group communication comprising providing a network connected server for use by a remote client computer. A first image from the remote client computer is received over the network and analyzed to determine and store its image attributes on the serve. The image is communicated to one or more recipients by the server over the network. First image communication information is stored including the image attributes and recipients. A second image from the remote client computer is received over the network and analyzed and stored on the serer to determine its image attributes. Second image communication information is stored and second image communication information is generated, relevant to the second image, based on the first image communication information and second image attributes. The second image communication information includes one or more second image recipients. Second image communication information is sent to the user and, upon approval, communicated to the one or more second image recipients.

Another preferred embodiment of the present invention includes a method of enhancing group communication comprising receiving at a server digital images included in a communication over a network. One or more of the digital images is sent to a first group of recipients, and first image attribute information and first image communication information is stored. A second plurality of digital images is received in a second digital communication over the network. A sender of the second digital communication receives second image communication information sent by the server based on the first image attribute information and the first image communication information. The server then sends one or more of the second digital images according to the second image communication information. Another group of digital images is received in another communication and third image communication information is transmitted to the source of the communication based on the first image attribute information, the first image communication information, and on the second image communication information. The digital images are communicated according to the third image communication information.

Preferred embodiments of the present invention disclose a system of communicating digital images and providing imaging products and services to consumers and has the advantage of increasing consumer satisfaction with provided imaging products and services. These, and other, aspects and objects of the present invention will be better appreciated and understood when considered in conjunction with the following description and the accompanying drawings. It should be understood, however, that the following description, while indicating preferred embodiments of the present invention and numerous specific details thereof, is given by way of illustration and not of limitation. For example, the summary descriptions above are not meant to describe individual separate embodiments whose elements are not interchangeable. In fact, many of the elements described as related to a particular embodiment can be used together with, and possibly interchanged with, elements of other described embodiments. In particular, descriptions of steps that are repeatedly used in several embodiments are not repeatedly described for each embodiment. However, it should be understood that the flow charts having steps labeled with similar descriptive text are described with reference to the earlier Figure containing that labeled step. Many changes and modifications may be made within the scope of the present invention without departing from the spirit thereof, and the invention includes all such modifications. The figures below are intended to be drawn neither to any precise scale with respect to relative size, angular relationship, or relative position nor to any combinational relationship with respect to interchangeability, substitution, or representation of an actual implementation.

BRIEF DESCRIPTION OF THE DRAWINGS

The above and other objects, features, and advantages of the present invention will become more apparent when taken in conjunction with the following description and drawings wherein identical reference numerals have been used, where possible, to designate identical features that are common to the figures, and wherein.

DETAILED DESCRIPTION OF THE INVENTION

Figure 1:
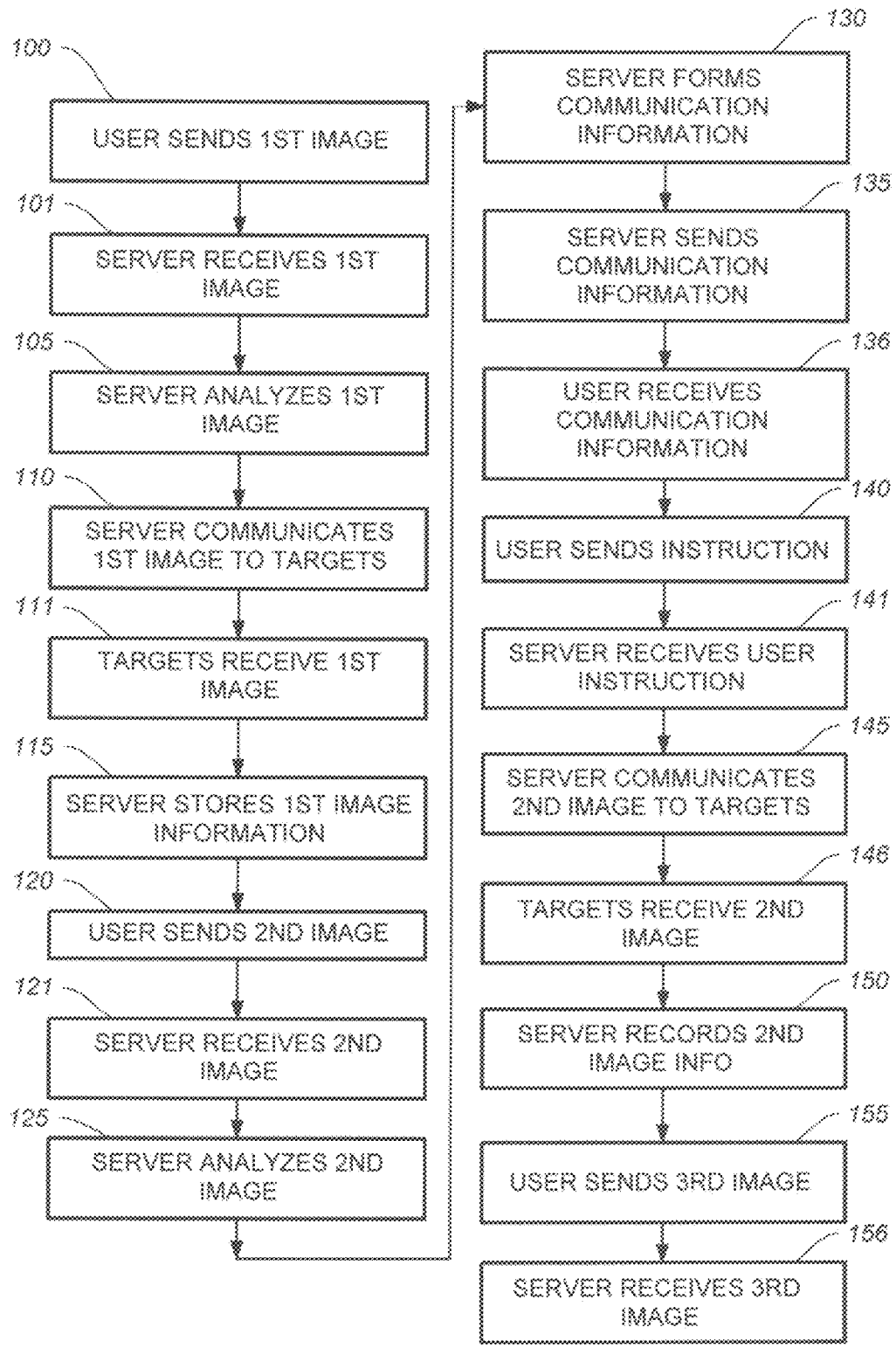
FIG. 1 is a flow diagram of a method of an embodiment of the current invention.
Figure 2:
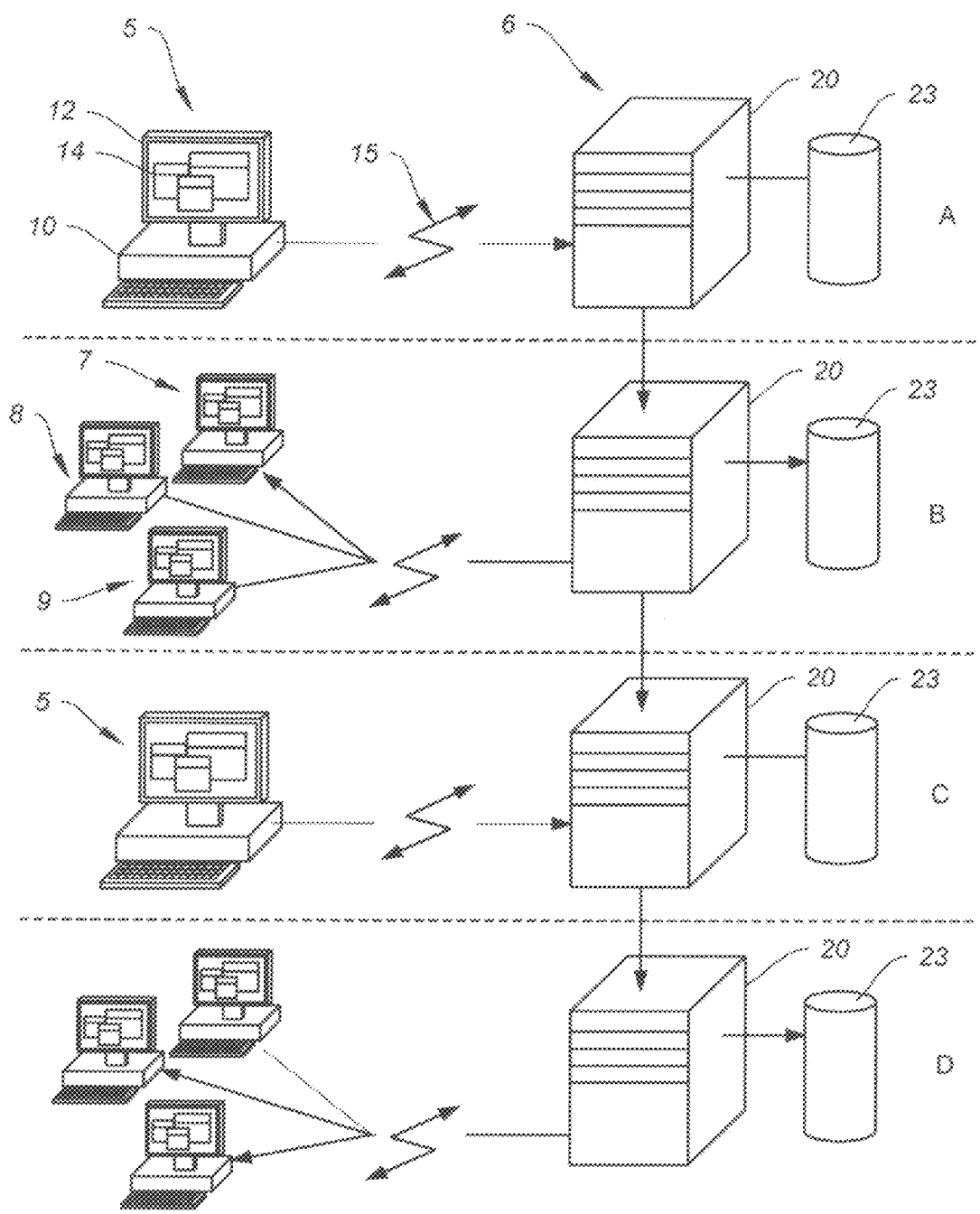
FIG. 2 is a sequential illustration of the components of an embodiment of the present invention.
Figure 3:
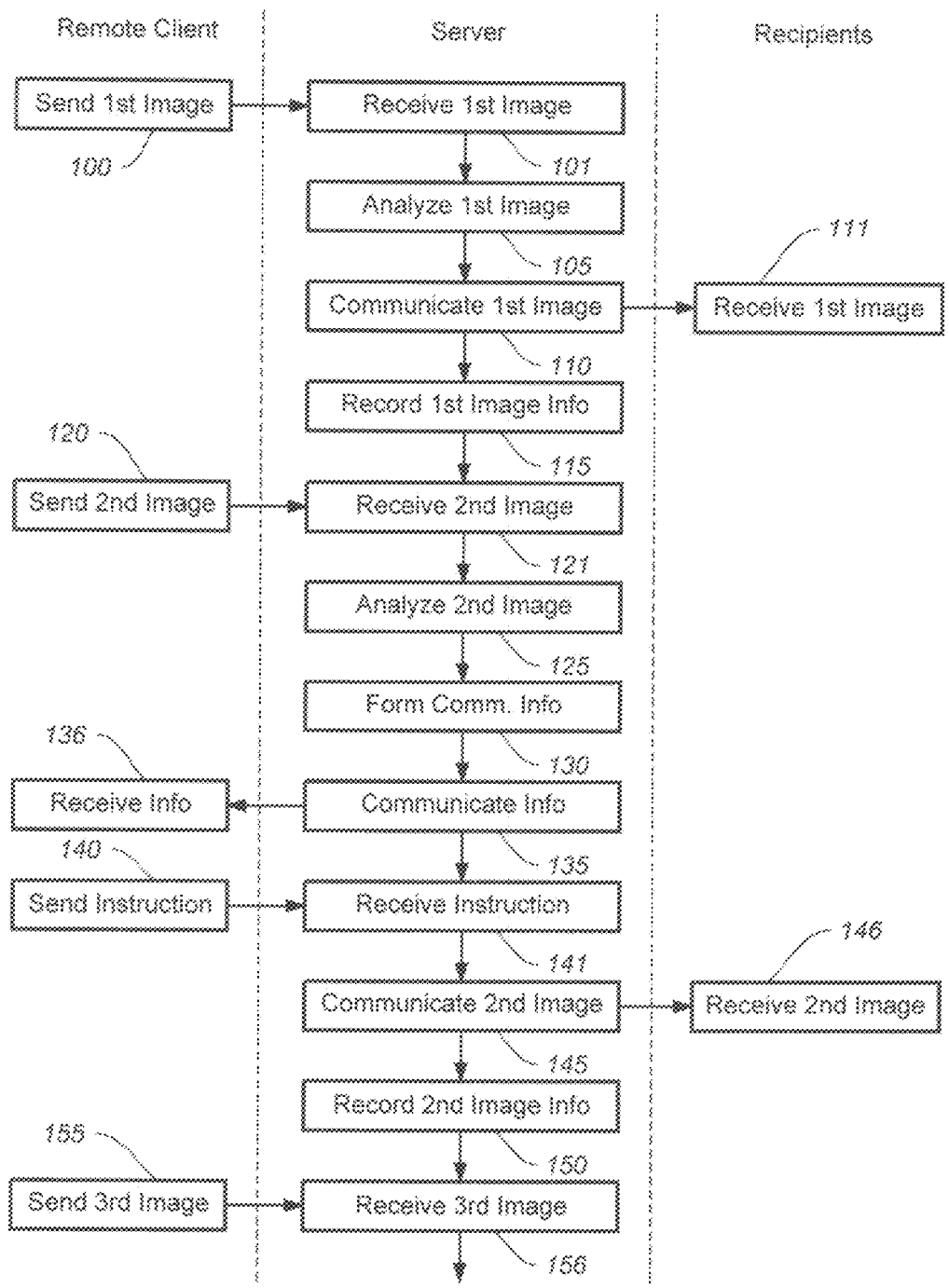
FIG. 3 is a flow diagram illustrating the interaction of the components according to a method of an embodiment the present invention.

FIG. 1 is a flow diagram of a method of a preferred embodiment of the current invention. FIG. 2 is a sequential illustration of the components of the embodiment, and FIG. 3 is a flow diagram illustrating the interaction of the components. Referring to FIGS. 1, 2, and 3 as one preferred embodiment of the present invention, a method of enhancing group communication comprises the steps of sending a first image, for example a digital image acquired from a digital camera, from a user in step 100. For example, as shown in FIG. 2A, a remote client computer 5 including a processor 10, a display 12, and a user interface 14 connected to a communication network 15, for example, the internet, sends the first image over the communication network 15 to a server computer 6 having a processor 20 and storage 23, for example a disk drive. The communication can be mediated through a web browser and webpage server, as is known in the online services art. The communication can be an email.

The server computer 20 receives the first image in step 101 and analyzes the first image to determine one or more first image attributes in step 105. Image attributes can include, for example, image identification information, seasons, object, individuals, metadata automatically generated by electronic image capture devices, and metadata added by user of the capture device or a user of the remote client computer. The computers 10 and 20 can be commercially available computers, for example a desktop home computer and a commercial web server, respectively.

The first image is communicated to one or more first image recipients in step 110 over the communication network 15 as shown in FIG. 2B. The recipients can be determined from a list of relatives and friends, together with email addresses, generated by a user, using a camera or the remote client PC, or obtained from lists maintained on another computer system, for example from a social networking site communicating with server 20, or stored at a user account at server 20. The recipients can receive the first image in step 111 on a remote recipient home computer 7. Other remote home computers 8, 9 connected to the communication network 15 do not receive the first image. The remote home computers 7, 8, 9 can be, but are not necessarily, similar to the originating remote home computer 5. In one preferred useful embodiment of the present invention, the communication of the first image from the server computer 20 to the recipient can be an email sent at the request of the user. The communication of the first image from the server computer 20 to the recipient computer 7 in steps 110 and 111 can be done before, after, or at the same time as the first image is analyzed in step 105. The communication can also include additional information, for example greetings, comments, or image information intended for the recipient by the user. Additional information can be provided through text or voice entry in a graphic user interface, for example as found in email systems.

First image communication information is recorded in step 115, for example by storing the information in storage 23. The first image communication information includes the one or more first image attributes and the one or more first image recipients, for example an email address, personal information associated with the owner of the email address, or information relating to the relationship between the user and the first recipient and first image contents. Such information can be provided directly by the user or obtained from databases that include such information, for example from information associated with a user in a social networking site. Image communication information can include, for example, destination information, communication reason information, communication product information, or communication type information. Image communication information can likewise be provided directly by the user or obtained from databases that include such information, for example from information associated with a user in a social networking site. The image communication information can also include a list of persons, a list of reasons, a list of products, or a list of communication types as part of the image communication. A list of persons can include relatives such as children, spouses, siblings, parents, grandparent, and grandchildren. Reasons can include holiday celebrations, birthdays, or rites of passage such as graduation or marriage. Product can include various image-based products, including image cards, photo-books, and framed prints. Communication types include written communications, email, instant messaging, electronic audio files, and electronic communication within a social network.

Referring to FIG. 2C, a second image, for example a digital image acquired by a digital camera, is sent from the user in step 120 and received by the server computer 20 in step 121. The second image can be sent from the remote client computer 5 or from a user's camera with wireless communication capability over the communication network 15 to the server computer 20, in a manner similar to that of the first image. The second image is analyzed to determine one or more second image attributes in step 125.

Second image communication information relevant to the second image is formed in step 130. The second image communication information includes one or more second image recipients. The second image communication information can be automatically formed by employing the first image communication information and the one or more second image attributes. For example, the first image attributes can be compared to the second image attributes. If a pertinent match is found between the first and second image attributes, the second image communication information can be automatically tailored to include one or more of the first image recipients in the group of the second image recipients.

For example, a parent might attend a relative's wedding and capture a first digital image at the wedding. The first digital image is electronically mailed to a distribution of relatives. A second digital image taken at the same wedding or at the wedding of another relative can be analyzed to determine that the second digital image is of a related wedding and the distribution of the first digital image is accessed. A second electronic message can then be prepared that includes the second digital image together with some or all of the distribution list of the first digital image. The second electronic message can be provided to the parent who then sends the prepared message to the distribution.

In another example, a person who made a first digital image, for example of a child, communicated the digital image to a relative, for example a grandparent. The grandparent subsequently purchased a photo-based product using the digital image. The communication and product purchase were recorded at the server. Subsequently a second digital image of the child was captured and sent to the server. The second digital image was analyzed at the server to determine that the second digital image was of the child. By comparing the digital image and product history, the server generates information to compile a second communication that is modified according to the results of comparing image attribute information and image communication information. The second communication will include the grandparent and product purchase information and is sent to the person, who subsequently sends the second communication to the grandparent, with the second digital image.

In step 135, at least a portion of the second image communication information is communicated to the user for user approval, and the user receives the information in step 136. In step 140, the user can send an approval or a specific instruction to the computer server 20 that is received by the computer server 20 in step 141, for example through the communication network 15. Information communicated to the user can include, for example, destination information, communication reason information, communication product information, communication type information, communication method, number of images to be communicated, and recipients.

According to a preferred embodiment of the present invention, the instruction is to communicate the second image to the suggested one or more second recipients or to a user-tailored list in step 145 and the second image is received by the user-approved second recipients in step 146, as illustrated in FIG. 2D.

As illustrated in FIGS. 1 and 3, the process can be continued, by recording the second image information (step 150), for example in the storage 23, sending a third image from the user's remote client computer 10 (step 155) and receiving the third image by the server computer 20 in step 156. The analysis is then performed and the process repeats from step 125. As more and more images are communicated and more image attributes and communication information corresponding to each of the images is recorded, each communicated image can be compared to a larger set of recorded information and a larger variety of image recipients determined, based on distribution lists of previously distributed images, so that the communicated images can be sent to the larger variety of pertinent image recipients.

For example, a user of a web-enabled internet image fulfillment and printing service owns a home computer that is a remote client of an image fulfillment and printing service server computer through the internet. The user uploads a digital image to the server computer. The server computer analyzes the digital image to determine relevant attributes. Known software algorithms for determining objects, colors, textures, or shapes appearing in each image are utilized in step 306. Although not described in detail herein, such algorithms are described in, for example, Digital Image Processing: PIKS Scientific Inside by William K. Pratt, 4th edition, copyright 2007 by John Wiley and Sons, ISBN: 978-0-471-76777-0, and U.S. Pat. No. 6,711,293, to Lowe, which defines an algorithm for object recognition and an aggregate correlation that is useable as a confidence value, which is incorporated herein by reference in its entirety. It is also known to detect the season or location in which an image is made. Face detection and recognition can be employed to determine and identify the presence of people in the image.

The user determines to send the image (for example by email) to a recipient. For example, the user could be a parent, the digital image could be an image of a baby, and the recipient a grandparent. The user could also select an image product that incorporates the digital image. This information is recorded and stored by the server computer. If additional applications of the digital image are subsequently made, information with respect to the application can be recorded and stored, as well. Hence, in a preferred embodiment of the present invention, a history of image communication and use can be maintained for the user and employed in the analysis of the image, subsequent image, or determination of communication information. The history can include a history of people with whom images have been shared, the types of images that have been shared, and types of products for which images have been used.

Subsequently, the user can choose to upload a second image. Analysis of the image by the server computer can determine that the second image is likewise of the same baby. A communication for the user is formed by the server computer incorporating the previously stored image attribute information and communication information to the effect that a related image was sent to the grandparent and an image product made. The newly generated communication is then sent to the user with a suggestion that the user send the second image to the grandparent and to make another (same or different) product for either the user or the grandparent. Upon receiving an instruction from the user, the second image is sent and a second image product made.

Various preferred methods of the present invention provide a way to automatically predict and suggest, based on historical user patterns and image analysis, the desired image sharing and use behavior of a user. The image sharing and use behavior can include with whom and how to share an image, and what to do with the image. Information about sharing an image can include a group with whom an image is shared, either to exclude or include other members. It can also include determining how many images should be shared with a recipient, i.e. one recipient can prefer to receive many images while another recipient can prefer to receive only a few. Information can be maintained in a history associated with each recipient, for example including the number of communications and preferred type of communications sent over a time period. Type of communication can include ancillary information related to the image or additional imaging or template information, for example greeting card or photobook formats. Types of images can include, for example people images versus scenery images. This information can be used to assist in forming the communication information for a particular image.

Preferred embodiments of the present invention provide the advantage of simplifying a user's choices of communication by presenting historical communication behavioral patterns to the user and suggesting actions, without the user having to recollect or research potential communication actions that might be desirable.

According to a preferred embodiment of the present invention, a method of the present invention can be implemented in computers executing software. The method can include the steps of: providing software for receiving a first image from a user; providing software for analyzing the first image to determine one or more first image attributes; providing software for communicating the first image to one or more first image recipients; providing software for recording and storing first image communication information, the first image communication information including the one or more first image attributes and the one or more first image recipients; providing software for receiving a second image from the user; providing software for analyzing the second image to determine one or more second image attributes; providing software for forming second image communication information relevant to the second image from the first image communication information and the one or more second image attributes, the second image communication information including one or more second image recipients; providing software for communicating at least a portion of the second image communication information to the user; and providing software for communicating the second image to the one or more second image recipients.

According to another preferred embodiment of the present invention, the method of the present invention can be implemented in computers executing software by providing a server computer connected by a computer network to a remote client computer; receiving a first image from the remote client computer over the computer network; analyzing the first image to determine one or more first image attributes with the server computer; communicating the first image to one or more first image recipients with the server computer through the computer network; recording and storing first image communication information, the first image communication information including the one or more first image attributes and the one or more first image recipients; receiving a second image from the remote client computer over the computer network; analyzing the second image to determine one or more second image attributes with the server computer; forming second image communication information relevant to the second image from the first image communication information and the one or more second image attributes, the second image communication information including one or more second image recipients with the server computer; communicating at least a portion of the second image communication information to the user with the server computer; and communicating the second image to the one or more second image recipients with the server computer.

According to yet another preferred embodiment of the present invention, a system for enhancing group communication comprises a computer server for receiving a first image through a computer network from a remote client computer, the computer server adapted to: analyze the first image to determine one or more first image attributes; communicate the first image to one or more first image recipients; record and store first image communication information, the first image communication information including the one or more first image attributes and the one or more first image recipients; receive a second image from the user; analyze the second image to determine one or more second image attributes; form second image communication information relevant to the second image from the first image communication information and the one or more second image attributes, the second image communication information including one or more second image recipients; communicate at least a portion of the second image communication information to the user; and communicate the second image to the one or more second image recipients.

The system can include a server computer adapted to load software for execution on the remote client computer, for example as is done with web browsers and web servers that provide web pages and executable software to remote client computers.

In yet another preferred embodiment of the present invention, a method of enhancing group communication comprises the steps of: communicating a first image to a remote server computer over a computer network; instructing the remote server computer to communicate the first image to one or more first image recipients; communicating a second image to a remote server computer over the computer network; receiving second image communication information from the remote server computer, the second image communication information including one or more second image recipients; instructing the remote server computer to communicate the second image to one or more of the second image recipients. The second image recipients can include at least one of the first image recipients.

Figure 4:
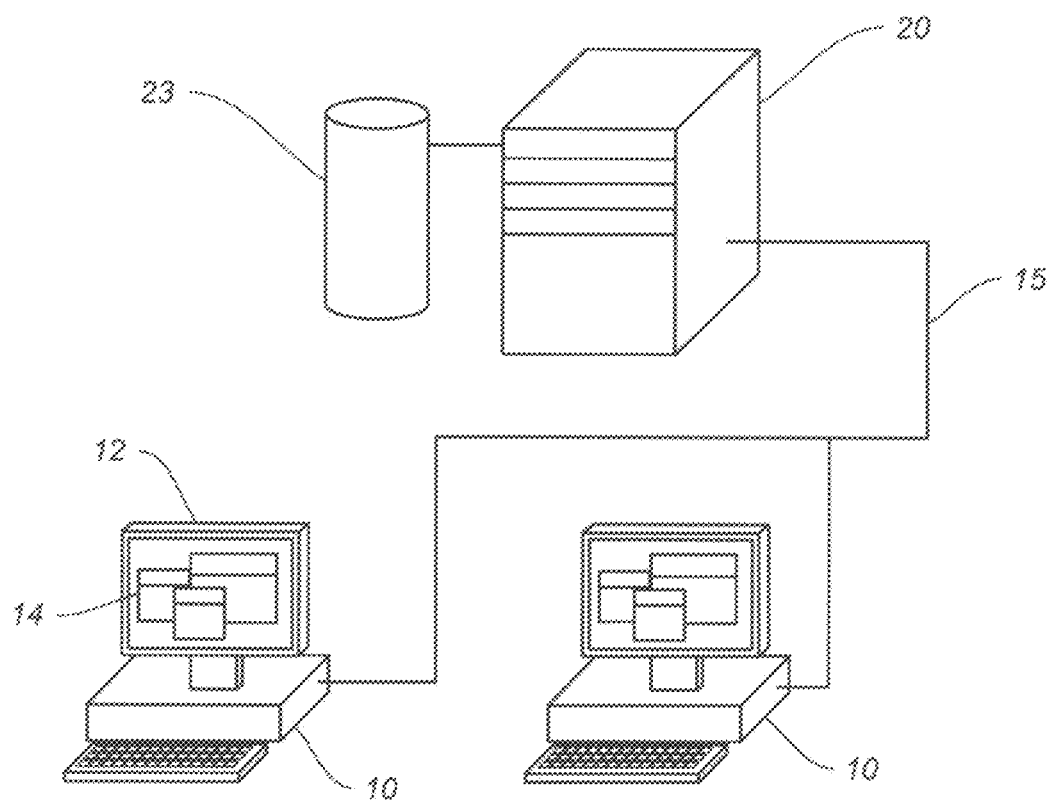
FIG. 4 is a prior-art schematic of a computer system having client and server computers.
Figure 5:
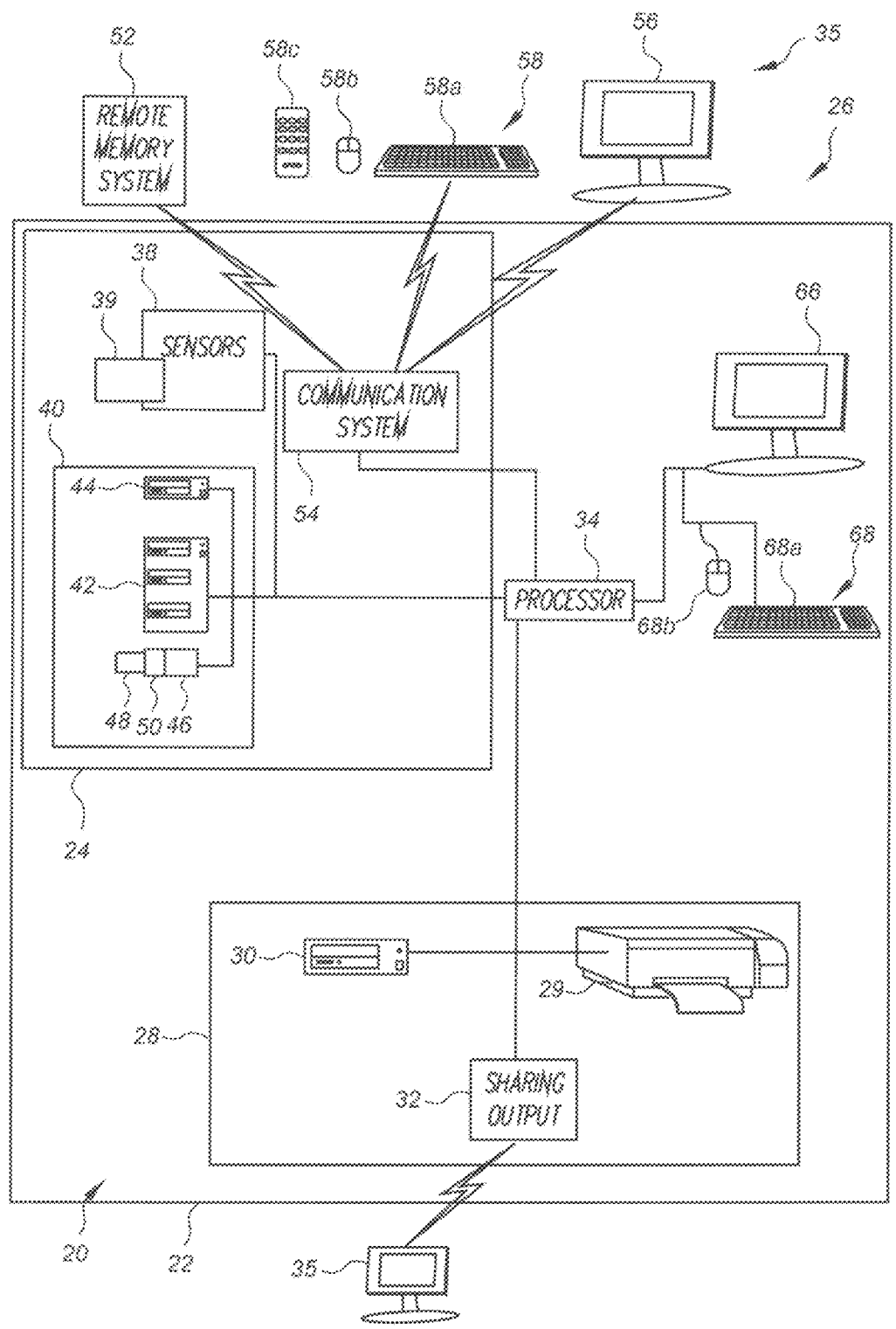
FIG. 5 is a schematic of a computer system useful with various embodiments of the present invention.

Computer servers and remote client computers useful in preferred embodiments of the present invention are illustrated in FIGS. 4 and 5. FIG. 4 illustrates a first preferred embodiment of an electronic system 26, a computer system, for implementing certain preferred embodiments of the present invention for automatically generating image products and services. In the preferred embodiment of FIG. 4, electronic computer system 26 comprises a source of content and program data files 24 such as software applications, image use profiles, user profiles, and image files, and which includes various memory and storage devices 40, a wired user input system 68 as well as a wireless input system 58, and an output system 28, all communicating directly or indirectly with processor 34. Although not shown, processor 34 is meant to illustrate typical processor system and chip components such as instruction and execution registers, an ALU, various levels of cache memory, etc. The source of program and content data files 24, user input system 68, or output system 28, and processor 34 can be located within a housing (not shown). In other preferred embodiments, circuits and systems of the source of content and program data files 24, user input system 68 or output system 28 can be located in whole or in part outside of a housing.

The source of content or program data files 24 can include any form of electronic, optical, or magnetic storage such as optical discs, storage discs, diskettes, flash drives, etc., or other circuit or system that can supply digital data to processor 34 from which processor 34 can load software, user profiles, image use profiles, image files, and other image information such as image metadata including derived and recorded metadata. In this regard, the content and program data files can comprise, for example and without limitation, software applications, a still image data base, image sequences, a video data base, graphics, and computer generated images, image usage information associated with still, video, or graphic images, user usage profiles, and any other data necessary for practicing preferred embodiments of the present invention as described herein. Source of content data files 24 can optionally include devices to capture images to create image data files by use of capture devices located at electronic computer system 20 and/or can obtain content data files that have been prepared by or using other devices or image enhancement and editing software. In the preferred embodiment of FIG. 4, sources of content or program data files 24 include sensors 38, a memory and storage system 40 and a communication system 54.

Sensors 38 can include one or more cameras, video sensors, scanners, microphones, PDAs, palm tops, laptops that are adapted to capture images and can be coupled to processor 34 directly by cable or by removing portable memory 39 from these devices and/or computer systems and coupling the portable memory to slot 46. Sensors 38 can also include biometric or other sensors for measuring physical and mental reactions. Such sensors including, but not limited to, voice inflection, body movement, eye movement, pupil dilation, body temperature, and p4000 wave sensors.

Memory and storage 40 can include conventional digital memory devices including solid state, magnetic, optical or other data storage devices, as mentioned above. Memory 40 can be fixed within system 26 or it can be removable and portable. In the preferred embodiment of FIG. 4, system 26 is shown having a hard disk drive 42, which can be an attachable external hard drive, which can include an operating system for electronic computer system 26, and other software programs and applications such as the preferred program algorithm embodiments of the present invention, a template design data base, derived and recorded metadata, image files, image attributes, software applications, and a digital image data base. A disk drive 44 for a removable disk such as an optical, magnetic or other disk memory (not shown) can also include control programs and software programs useful for certain preferred embodiments of the present invention, and a memory card slot 46 that holds a removable portable memory 48 such as a removable memory card or flash memory drive or other connectable memory and has a removable memory interface 50 for communicating with removable memory 48. Data including, but not limited to, control programs, template designs, derived and recorded metadata, digital image usage files, user attributes, image attributes, software applications, digital images, and metadata can also be stored in a remote server 52 such as a personal computer, computer network, a network connected server, or other digital system having a memory system for data storage.

In the preferred embodiment shown in FIG. 5, system 26 has a communication system 54 that in this embodiment can be used to communicate with an optional remote input 58, remote server system 52, an optional remote display 56, for example by transmitting image designs in the form of calendar template designs with or without merged images and receiving from remote server system 52, a variety of control programs, template designs, derived and recorded metadata, image files, image attributes, and software applications. Although communication system 54 is shown as a wireless communication system, it can also include a modem for coupling to a network over a communication cable for providing to the computer system 26 access to the network and server system 52. A remote input station including a remote display 56 and/or remote input controls 58 (also referred to herein as "remote input 58") can communicate with communication system 54 wirelessly as illustrated or, again, can communicate in a wired fashion. In a preferred embodiment, a local input station including either or both of a local display 66 and local user input controls 68 (also referred to herein as "local user input 68") is connected to processor 34 which is connected to communication system 54 using a wired or wireless connection.

Communication system 54 can comprise for example, one or more optical, radio frequency or other transducer circuits or other systems that convert data into a form that can be conveyed to a remote device such as server 52 or remote display 56 using an optical signal, radio frequency signal or other form of signal. Communication system 54 can also be used to receive a digital image and other data, as exemplified above, from a host or server computer or network (not shown), a server 52 or a remote input 58. Communication system 54 provides processor 34 with information and instructions from signals received thereby. Typically, communication system 54 will be adapted to communicate with the server 52 by way of a communication network such as a conventional telecommunication or data transfer network such as the internet, and peer-to-peer; cellular or other form of mobile telecommunication network, a local communication network such as wired or wireless local area network or any other conventional wired or wireless data transfer system.

User input system 68 provides a way for a user of system 26 to provide instructions to processor 34, such instructions comprising automated software algorithms of particular preferred embodiments of the present invention that automatically generate coordinated image templates according to selected template designs. This software also allows a user to make a designation of content data files, such as selecting calendar templates and designating digital image files, to be used in automatically generating an image enhanced output calendar product according to a preferred embodiment of the present invention and to select an output form for the output product. User controls 68a, 68b or 58a, 58b in user input system 68, 58, respectively, can also be used for a variety of other purposes including, but not limited to, allowing a user to arrange, organize and edit content data files, such as coordinated image displays and calendar image templates, to be incorporated into the image output product, for example, by incorporating image editing software in computer system 26 which can be used to override design automated image output products generated by computer system 26, as described below in certain preferred method embodiments of the present invention, to provide information about the user, to provide annotation data such as text data, to identify characters in the content data files, and to perform such other interactions with system 26 as will be described later.

In this regard user input system 68 can comprise any form of device capable of receiving an input from a user and converting this input into a form that can be used by processor 34. For example, user input system 68 can comprise a touch screen input 66, a touch pad input, a multi-way switch, a stylus system, a trackball system, a joystick system, a voice recognition system, a gesture recognition system, a keyboard 68a, mouse 68b, a remote control or other such systems. In the preferred embodiment shown in FIG. 5, electronic computer system 26 includes an optional remote input 58 including a remote keyboard 58a, a remote mouse 58b, and a remote control 58c. Remote input 58 can take a variety of forms, including, but not limited to, the remote keyboard 58a, remote mouse 58b or remote control handheld device 58c illustrated in FIG. 5. Similarly, local input 68 can take a variety of forms. In the preferred embodiment of FIG. 5, local display 66 and local user input 68 are shown directly connected to processor 34.

Figure 6:
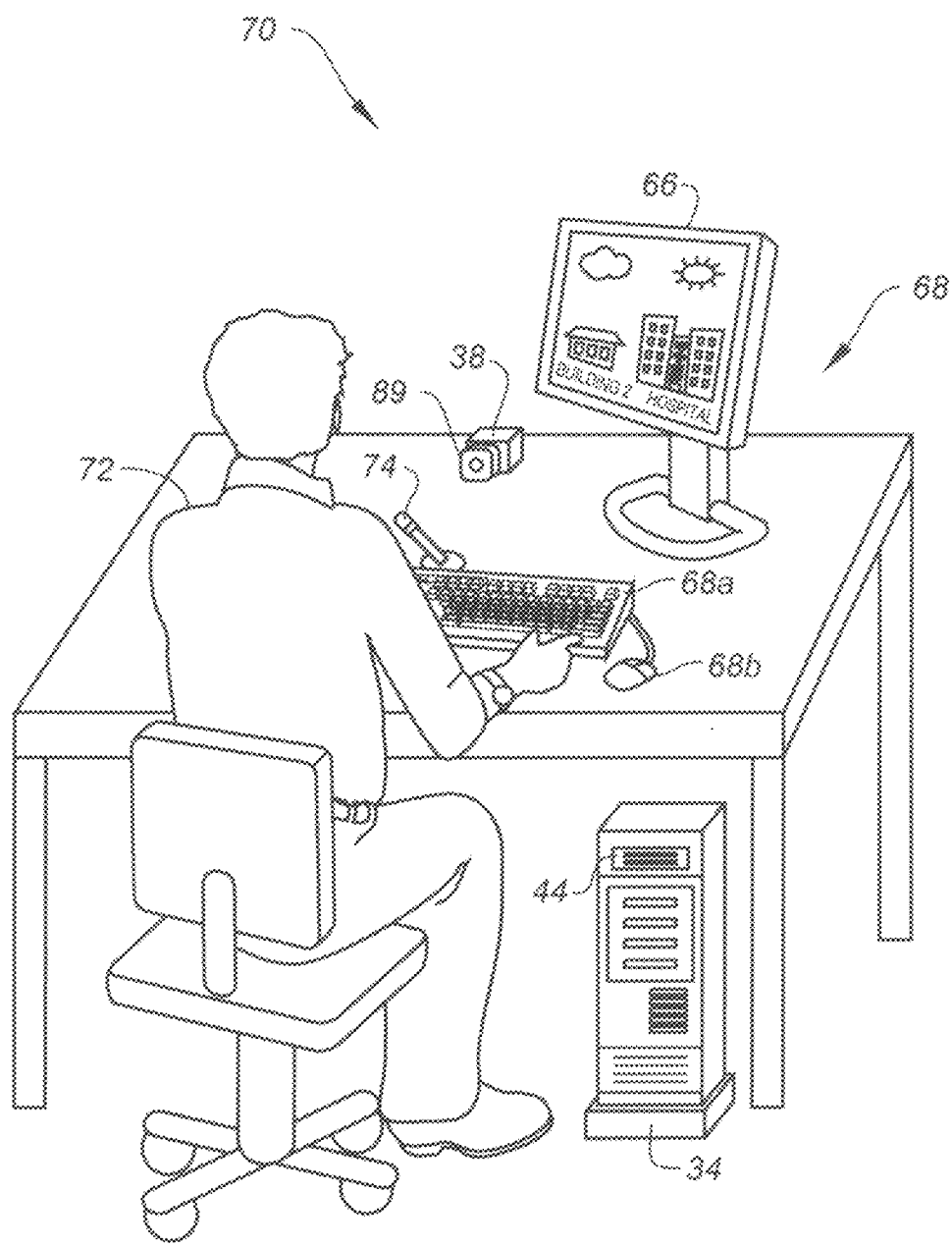
FIG. 6 is a schematic of a computer system useful with various embodiments of the present invention.

As is illustrated in FIG. 6, computer system 26 and local user input system 68 can take the form of an editing studio or kiosk 70 (hereafter also referred to as an "editing area 70"), although this illustration is not intended to limit the possibilities as described in FIG. 5 of editing studio implementations. In this illustration, a user 72 is seated before a console comprising local keyboard 68a and mouse 68b and a local display 66 which is capable, for example, of displaying multimedia content. As is also illustrated in FIG. 6, editing area 70 can also have sensors 38 including, but not limited to, camera or video sensors 38 with built-in lenses 89, audio sensors 74 and other sensors such as, for example, multispectral sensors that can monitor user 72 during a user or production session.

Output system 28 (FIG. 5) is used for rendering images, text, completed or uncompleted digital image templates and other digital image output products, or other graphical representations in a manner that allows an image output product to be generated. In this regard, output system 28 can comprise any conventional structure or system that is known for printing, displaying, or recording images, including, but not limited to, printer 29. For example, in other preferred embodiments, output system 28 can include a plurality of printers 29, 30, 32, and types of printers, including transfer machines capable of screen printing t-shirts and other articles. Processor 34 is capable of sending print commands and print data to a plurality of printers or to a network of printers. Each printer of the plurality of printers can be of the same or a different type of printer, and each printer may be able to produce prints of the same or a different format from others of the plurality of printers. Printer 29 can record images on a tangible surface, such as on, for example, various standard media or on clothing such as a T-shirt, using a variety of known technologies including, but not limited to, conventional four-color offset separation printing or other contact printing, silk screening, dry electrophotography such as is used in the NexPress 2100 printer sold by Eastman Kodak Company, Rochester, N.Y., USA, thermal printing technology such as in thermal printer 30, drop on demand ink jet technology and continuous inkjet technology. For the purpose of the following discussions, printers 29, 30, 32 will be described as being of a type that generates color images. However, it will be appreciated that this is not necessary and that the claimed methods and apparatuses herein can be practiced with printers 29, 30, 32 that print monotone images such as black and white, grayscale or sepia toned images.

In certain preferred embodiments, the source of content data files 24, user input system 68 and output system 28 can share components. Processor 34 operates system 26 based upon signals from user input system 58, 68, sensors 38, memory 40 and communication system 54. Processor 34 can include, but is not limited to, a programmable digital computer, a programmable microprocessor, a programmable logic processor, a series of electronic circuits, a series of electronic circuits reduced to the form of an integrated circuit chip, or a series of discrete chip components.

The invention has been described in detail with particular reference to certain preferred embodiments thereof, but it will be understood that variations and modifications can be effected within the spirit and scope of the invention.

PARTS LIST 5 remote client computer
7, 8, 9 recipient computers
10 processor
12 display
14 user interface
15 communication network
20 server computer
23 storage
24 system
26 system
28 system
29 printer
30 printer
32 I/O
34 processor
35 I/O
38 sensor
39 memory
40 storage
42 storage
44 storage
46 comm
48 memory
50 interface
52 server
54 system
56 I/O
58 I/O
58a I/O
58b I/O
58c I/O
66 I/O
68 I/O
68a I/O
68b I/O
70 system
72 user
100 send 1st image step
101 receive 1st image step
105 analyze 1st image step
110 communicate 1st image step
111 receive 1st image step
115 store 1st image information step
120 send 2nd image step
121 receive 2nd image step
125 analyze 2nd image step
130 form communication information step
135 send communication information step
136 receive communication information step
140 send user instruction step
141 receive user instruction step
145 communicate 2nd image step
146 receive 2nd image step
150 record 2nd image info step
155 send 3rd image step
156 receive 3rd image step

The invention claimed is:

1. A method of enhancing group communication, comprising the steps of:
  receiving a first image from a user;
  analyzing the first image to determine one or more first image attributes;
  communicating the first image to one or more first image recipients;
  recording and storing first image communication information, wherein the recorded and stored first image communication information comprises the one or more first image attributes and the one or more first image recipients;
  receiving a second image from the user;
  analyzing the second image to determine one or more second image attributes;
  forming second image communication information relevant to the second image based on the recorded and stored first image communication information and including the second image attributes;

communicating at least a portion of the second image communication information to the user; and communicating the second image to one or more second image recipients.

2. The method of claim 1, further including the step of recording and storing image identification information, communication destination information, communication reason information, communication product information, or communication type information.

3. The method of claim 1, further including the step of communicating to the user communication destination information, communication reason information, communication product information, or communication type information.

4. The method of claim 1, further including the step of communicating a communication method or a number of images to be communicated.

5. The method of claim 1, further including the steps of:
receiving a third image from the user;
communicating to the user third image communication information; and
communicating the third image.

6. The method of claim 1, further including the step of maintaining a history of image communication for the user.

7. The method of claim 6, further including the step of maintaining a history of people with whom images have been shared, the types of images that have been shared, and types of products for which images have been used.

8. The method of claim 1, further including the step of receiving an instruction from the user to communicate an image.

9. The method of claim 1, further including the step of emailing the first image to communicate the image.

10. The method of claim 1, further including the step of recording email address information and personal information associated with the owner of the email address.

11. The method of claim 1, further including the step of providing a list of persons, a list of reasons, a list of products, or a list of communication types as part of the second image communication.

12. The method of claim 1, wherein at least one of the second image recipients is a first image recipient.

13. A method of enhancing group communication, comprising the steps of:
providing a server computer connected by a computer network to a remote client computer;
receiving a first image from the remote client computer over the computer network;
the server computer analyzing the first image to determine one or more first image attributes;
the server computer communicating the first image to one or more first image recipients over the computer network;
recording and storing first image communication information, wherein the recorded and stored first image communication information comprises the one or more first image attributes and the one or more first image recipients;
receiving a second image from the remote client computer over the computer network;
the server computer analyzing the second image to determine one or more second image attributes;
the server computer forming second image communication information relevant to the second image based on the recorded and stored first image communication information, wherein the second image communication information comprises one or more second image recipients and the one or more second image attributes;
the server computer communicating at least a portion of the second image communication information to a sender of the second image; and
the server computer communicating the second image to the one or more second image recipients.

14. The method of claim 13, further including the step of storing image identification information, communication destination information, communication reason information, communication product information, or communication type information in association with the first image.

15. The method of claim 13, further including the step of sending destination information, communication reason information, communication product information, or communication type information to the sender of the second image.

16. The method of claim 13, further including the steps of:
receiving a third image from the remote client computer over the computer network;
the server computer communicating third image communication information based on the first image communication information, and on the second image communication information; and
communicating the third image according to the third image communication information.

17. The method of claim 13, further including the step of maintaining a history of image communication for a sender of the first image.

18. The method of claim 17, further including the step of maintaining a history of people with whom the first and second images have been shared, types of the first and second images that have been shared, and types of products for which the first and second images have been used.

19. The method of claim 13, further including the step of receiving an instruction for communicating the second image to the one or more second image recipients from the sender of the second image.

* * * * *